Aug. 14, 1928.
A. L. BAUSMAN
1,680,842
FEEDING MECHANISM FOR CONFECTIONERY MACHINES
Filed June 8, 1927     2 Sheets-Sheet 1
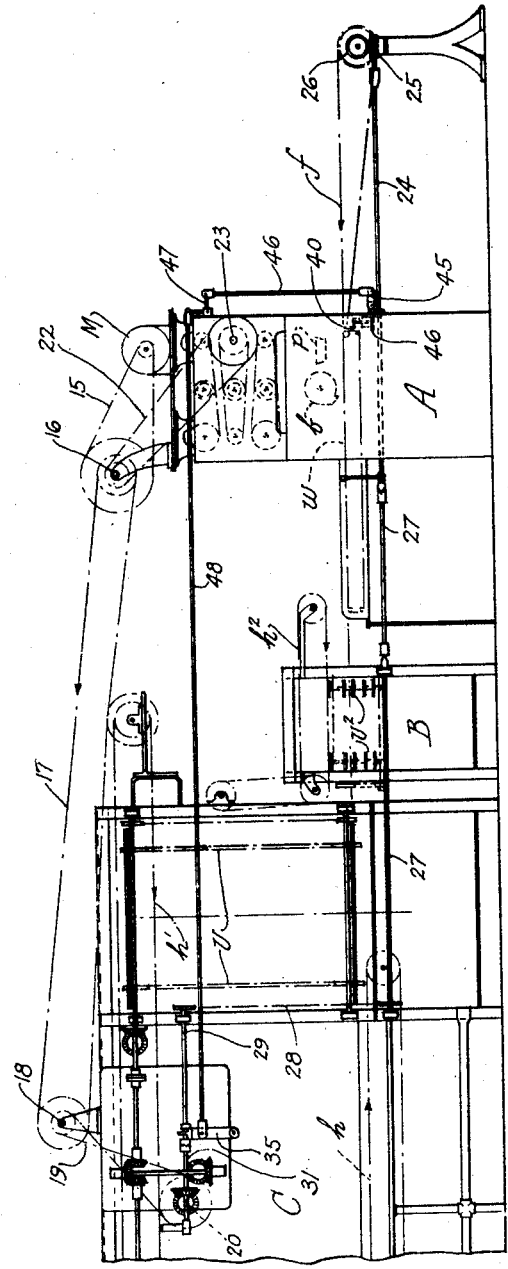
INVENTOR.
Alonzo Linton Bausman
BY Chapin & Neal
ATTORNEYS.

Aug. 14, 1928.  1,680,842
A. L. BAUSMAN
FEEDING MECHANISM FOR CONFECTIONERY MACHINES
Filed June 8, 1927    2 Sheets-Sheet 2
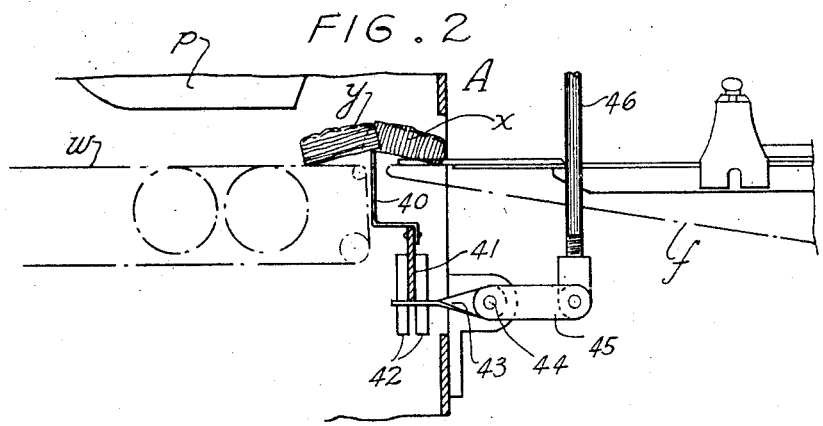
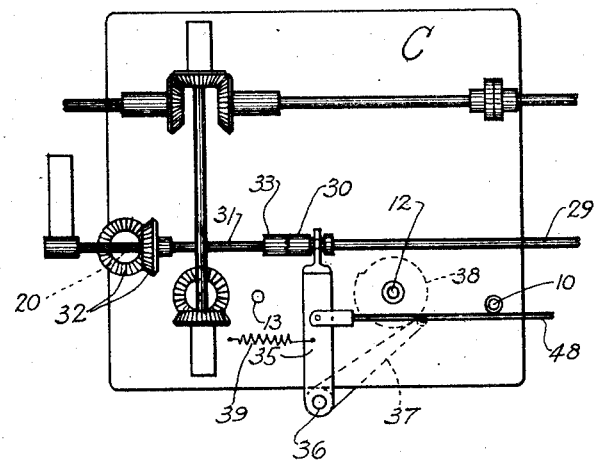
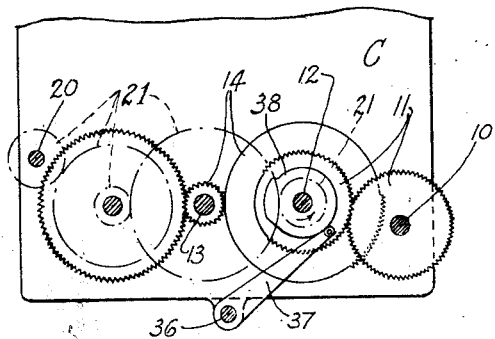
INVENTOR.
Alonzo Linton Bausman
BY Chapin + Neal
ATTORNEYS.

Patented Aug. 14, 1928.

1,680,842

UNITED STATES PATENT OFFICE.

ALONZO LINTON BAUSMAN, OF SPRINGFIELD, MASSACHUSETTS.

FEEDING MECHANISM FOR CONFECTIONERY MACHINES.

Application filed June 8, 1927. Serial No. 197,462.

This invention relates to improvements in feeding mechanism for confectionery machines. The invention, while capable of other applications, is especially suitable for use in connection with a machine of the general class disclosed in my United States Letters Patent No. 1,511,256, granted October 14, 1924.

The apparatus of said patent is characterized by an arrangement designed to eliminate the usual plaque delivery belt of a candy coating machine and to eliminate the necessity for manually transferring plaques loaded with freshly coated candies from the coating machine to the cooling apparatus. Trays, carrying movable plaques, are successively taken from the cooling apparatus, presented to the delivery end of the coating machine, automatically loaded with freshly coated candies and then returned to the cooling apparatus. The plaque while in confection receiving relation, is arranged to move in the same direction as the coating belt of the confection coating machine whereby the plaque may be loaded with a number of transverse rows of coated confections.

In the apparatus of my prior patent, means were provided for the purpose of preventing coated confections from passing off the coating belt of the coating machine during the relatively short interval required for the removal of a loaded plaque and tray and the presentation of an unloaded plaque and tray into receiving relation with said coating belt. One expedient disclosed, for the above purpose, consisted in stopping both the feed belt and the coating belt of the coating machine during the interval referred to. The arrangement was such that the belts moved when the receiving plaque moved and for like intervals.

The present invention is directed to, and has for an object, the provision of improved means for the same broad purpose, as above described.

According to one feature of the invention, I provide means for stopping the feed belt of the coating machine without stopping the coating, or so-called "wire belt." The importance of this arrangement lies in the fact that when the feed belt stops feeding confections onto the wire belt, the latter continues to move and thus carries the confections not only through but beyond the coating flow of chocolate, whereas if the wire belt stops when the feed belt stops some of the confections come to rest under the coating flow and become literally flooded with chocolate during the interval of rest.

Another feature of the invention consists in rendering the control of the feed belt independent of the movement of the receiving plaque, at least to the extent that the feed belt can be stopped somewhat before the plaque stops, thereby preventing coated confections from being fed onto the receiving plaque too close to the end of the same and in some cases, preventing such confections from being fed only partially onto the plaque so that they fall off the same, when the plaque is removed.

A further feature of the invention consists in the provision of means for insuring a sharp division between the groups of confections fed by the feed belt and eliminating the difficulties arising from so-called "straggler" confections. When the feed belt stops, a confection may lie partially on the feed belt and partially on the wire belt, straddling the gap therebetween. It is always uncertain as to what will happen to a confection, thus positioned. It may remain in this position in which event no harm will be done. On the other hand, it may be temporarily retarded due to the stopping of the feed belt or it may remain stationary for a time after the fed belt stops and then be dragged away by the wire belt, in which event it becomes a "straggler" because it lags behind its companions of the group of confections fed to the wire belt. The straggler will very likely reach the delivery point at a time when no plaque is in position to receive it.

In carrying out the last-named object, I prefer to provide a thin, transversely-disposed member which is vertically reciprocable in the gap between the delivery end of the feed belt and the receiving end of the wire belt. This member, while the belts are in motion lies below the confection carrying stretches of the belts but, when the feed belt stops, the member is projected upwardly and sufficiently above said plane to form a positive barrier to the passage of confections from the feed belt to the wire belt. The most important consideration, however, is that this member forces any confections which may be straddling the gap to either go immediately with the wire belt or remain with the feed belt because such confections will be lifted up by the member and caused to tilt one way or the other.

Other objects and advantages will appear in the following description and will be pointed out in the appended claims.

The invention will be disclosed with reference to the accompanying drawings, in which:—

Fig. 1 is a small scale side elevational view showing in more or less conventional form an apparatus of the class disclosed in my prior patent with the improvements of this invention applied thereto;

Fig. 2 is a fragmentary sectional view, drawn to a larger scale and showing in detail the projectable member in the gap between the feed and wire belts;

Fig. 3 is an enlarged side elevational view of part of the cooling apparatus showing a detail of the mechanism for controlling the operation of the feed belt and projectable member; and Fig. 4 is a sectional view showing in conventional form, the driving mechanism for the conveyers of the cooling apparatus and another part of the mechanism for controlling the operation of the feed belt and projectable member.

In Fig. 1 of these drawings, I have shown in conventional form part of an apparatus which is, or may be, identical in general construction and operation with that shown in the above mentioned patent. Inasmuch as the novelty in the present invention turns on the improved way in which the feeding of the confections to the apparatus is effected, it is deemed unnecessary to illustrate and describe the apparatus in detail. For present purposes it will suffice to state that confections are placed on feed belt $f$, fed thereby to the wire belt $w$ of the coating machine A, coated in the usual or any suitable manner, and delivered onto a movable plaque carried by a tray. The trays are taken succesively from the lower horizontally movable conveyer $h$ of an apparatus C, and moved into a tray transfer apparatus B. Both apparatus B and C are constructed as shown in my prior patent, above identified and apparatus C is of the general type shown in U. S. Letters Patent No. 1,123,934, granted January 5, 1915, on an invention of Schrafft, Blake and Lorentzen. The apparatus B functions to position a tray with the plaque carried thereby in position to receive the coated confections delivered by wire belt $w$, and subsequently to move the tray and plaque, when loaded with coated confections, back into the apparatus C. The loaded trays are placed in a vertical conveyer $v$, which lifts them to the level of, and transfers them to, an upper horizontal conveyer $h'$ traveling in a direction opposite to conveyer $h$. A second vertical conveyer (not shown) takes trays from conveyer $h'$ and brings them to and transfers them to the conveyer $h$, and the coated confections are removed from the plaques while the latter are being carried by conveyer $h$. This is the general operation which is identical with that disclosed in the patent first above mentioned.

The conveyers $h$ and $h'$ of the apparatus C and the horizontal conveyer $h^2$ of the apparatus B are operated simultaneously at periodic intervals. They are all driven from a shaft 10 which, as shown in Fig. 4, is connected by intermittent gears 11 to a drive shaft 12 which operates continuously. The vertical conveyers of apparatus C and the vertical conveyer $v^2$ of apparatus B likewise operate simultaneously at periodic intervals and while the horizontal conveyers are at rest. These vertical conveyers are all driven from a shaft 13 which is connected by intermittent gears 14 to the drive shaft 12. The arrangement is such that the horizontal conveyers operate during the major portion of each revolution of shaft 12, say five-sixths of a revolution while the vertical conveyers operate during the remainder of the revolution,—say one-sixth of a revolution. Shaft 12 may be driven in any suitable manner. As shown, it is driven by a motor M located on top of the coating machine A. Motor M drives by a belt 15, a jack shaft 16 mounted on top of casing A and this shaft drives by a belt 17 a shaft 18 in apparatus C. Shaft 18 drives by a belt 19 a shaft 20 which in turn drives through gear reduction mechanism 21 the drive shaft 12, above referred to. The motor driven jack shaft 16 is also connected by a belt 22 to the drive shaft 23 of coating machine A whereby the wire belt $w$ and all other parts of the coating machine A with the exception of feed belt $f$ are driven.

The feed belt $f$ is driven in the following manner. Its usual drive shaft 24, which by means of a worm 25 and gear 26 operates the feed belt, is extended by a shaft 27 to the apparatus C and there connected by a chain 28 and suitable sprockets to a shaft 29, which has slidably keyed thereto a clutch element 30. Alined with shaft 29 is a shaft 31 which is driven by bevel gears 32 from the described shaft 20 and has fixed thereto a clutch element 33. The sliding clutch element 30 is shifted by a lever 35 fixed to a cross shaft 36. The latter, as shown in Fig. 4, has fixed thereto a lever 37, the free end of which rides on the periphery of a cam 38, fixed to the drive shaft 12, above described. A spring 39 tends to hold the lever 37 against its cam and to hold the clutch elements engaged. As shown, cam 38 is arranged to cause the disengagement of the clutch elements after the horizontal conveyers have been moved for a predetermined portion of their travel, say for example, around 75 or 80 per cent. These clutch elements are then held disengaged for the balance of the travel of the horizontal conveyers and also during all of the travel of the vertical conveyers, when the cam allows the clutch elements to be reengaged. Thus, the feed belt $f$ is operated during the interval when the horizontal conveyers are operating but not necessarily, as in the first mentioned patent, during all of said interval.

Referring now to Fig. 2, a thin plate 40 extends transversely with respect to the direction of travel of belts $f$ and $w$ and is mounted to move up and down in the gap between said belts. While feed belt $f$ is in operation, the upper edge of plate 40 lies at a level below that of the confection carrying stretches of belts $f$ and $w$ but when belt $f$ stops, the plate is projected upwardly in the aforesaid gap to a level above that of said stretches so as to form a positive barrier to the passage of any more confections from belt $f$ to belt $w$. As shown, plate 40 is secured to a cross bar 41 mounted at its ends to slide in suitable guideways 42 provided on the side walls of casing A. The weight of the plate and cross bar is sufficient to move it downwardly although of course any other suitable means may be provided for this purpose. The cross bar 41 rests on one or more arms 43 fixed to a cross shaft 44 carried by a casing A. Also fixed to shaft 44 is a lever 45, which is connected by a link 46 to one arm of a bellcrank lever 47 pivotally mounted on casing A. The other arm of lever 47 is connected by a link 48 to the clutch shifting lever 35. Thus, when the clutch elements are disengaged plate 40 will be projected upwardly and this action occurs simultaneously with the stopping of the feed belt $f$. While the feed belt is in operation and the clutch elements are engaged, member 40 will occupy its lower position and allow free passage of confections from belt $f$ to belt $w$.

The projectable member 40 constitutes a most important feature of this invention because it effectively takes care of the situation when confections lie across the gap at the moment when the feed belt is stopped. Without this device, one cannot surely control the confections which happen to overlie the gap at the time when belt $f$ stops. Such confections rest partly on the stationary feed belt and partly on the moving wire belt. Their frictional engagement with the feed belt may of course be sufficient to hold them stationary during all of the interval of rest of the feed belt or they may, as frequently happens, cling to the belt for a short time and then be gradually dragged away by and carried along with the wire belt, lagging so far behind the companion confections of the group that they reach the delivery point too late to pass onto a plaque. The member 40 forces such confections to either go along with the companion confections of its group or else to remain behind and go with the next succeeding group and compels a sharp division line between the groups. Any confections bridging the gap when member 40 is projected upwardly must definitely do one thing or the other. They will be either tilted towards the wire belt or tilted towards the feed belt. It is unlikely that member 40 could strike exactly through the center of gravity of a confection and rise with the confection balanced thereon because the blade is so thin as to necessitate an exact nicety of balance which is a contingency too remote to require consideration. However, if by chance the confection were exactly balanced on the thin edge of plate 40 and remained balanced while it was being elevated, it would very likely remain in the same state until the plate descended,—therefore accomplishing the same purpose as if tipped back onto the feed belt. The normal action of plate 40 is shown in Fig. 2. The plate, on rising, lifts those confections, which bridge the gap between the feed belt $f$ and wire belt $w$, and tilts them one way or the other. Those which are tilted as shown at $x$ remain stationary until plate 40 is again lowered and belt $f$ started. Those which are tilted, as at $y$, have one end engaged with the wire belt, which moving continuously, drags the confection off the thin plate 35 and carries it along with its group.

In operation, the feed belt $f$ moves intermittently under the control of cam 38, whereby the operation of the feed belt is independent of the operation of all of the various conveyers including the wire belt. In this way, the wire belt can move continuously and the time of starting and stopping of the feed belt can be controlled to a nicety (the cam may be angularly adjusted to permit variations of timing when necessary or desired) and the confections can be fed to the wire belt in longitudinally spaced groups so disposed on the wire belt and so spaced thereon as to be delivered properly spaced upon a plaque at the time when the latter is in confection receiving relation with the wire belt. As shown herein, the wire belt $w$ is of such length as to hold two groups of confections. While one group is being fed onto the wire belt another group is being fed onto a plaque. Thus, during the interval when the feed belt is stopped and the loaded plaque is being moved out of confection receiving relation and another plaque is being moved into such relation, the wire belt is carrying along a group of confections toward the delivery point. If the wire belt stopped when the feed belt stopped, then the confections of one group, or some of them, would come to rest under the shower pan *p* and receive an excess coating. Some of them might come to rest in under the blower *b* and have most of the coatings, previously applied, blown off. Thus, it is important to keep the wire belt moving and the present invention affords the means for stopping the feed belt without stopping the wire belt and for controlling its operation in such a way that groups of confections may be fed to the coating machine in such a way as to become accurately positioned in the desired relation on the plaques.

When the feed belt stops, the member 40 rises and not only forms a positive barrier to the passage of any more confections onto the wire belt but also forces any confections which may be bridging the gap between the feed and wire belts to either remain with the feed belt or go with the wire belt. It definitely eliminates the "stragglers" as has been above explained in detail.

The invention has been disclosed herein in an embodiment at present preferred, for illustrative purposes but the scope of the invention is defined by the appended claims rather than by the foregoing description.

What I claim is:

1. In an apparatus, wherein plaques are successively moved into confection receiving relation with the conveyer of a confection coating machine, moved while in such relation until they are loaded with confections and then removed; a feed belt for delivering articles to be coated to said conveyer, driving means for operating said conveyer continuously, and driving means for intermittently operating the feed belt so that confections will not pass off the delivery end of said conveyer during the interval in which a loaded plaque is being moved out of confection receiving relation and a fresh plaque is being moved into such relation.

2. In an apparatus, wherein alternately operable mechanisms are provided one for moving a plaque into and subsequently out of confection receiving relation with the conveyer of a confection coating machine and the other for moving the plaque while in said relation; means for driving said conveyer continuously, means for feeding articles to be coated to said conveyer, driving means for the feeding means, and means independent of both said mechanisms for periodically connecting and subsequently disconnecting the feeding means from its driving means, whereby confections may be fed in groups to said conveyer in such a manner that no confections will pass off said conveyer during the operation of the first named mechanism.

3. In a confectionery machine, a pair of conveyers arranged for the feeding of articles from one to the other, the receiving end of one being separated from the delivery end of the other by a small gap, means for intermittently operating the feeding conveyer, and means movable upwardly through said gap into the path of the articles when the feeding conveyer stops and movable downwardly out of said path when the feeding conveyer is subsequently started.

4. In a confectionery machine, a conveyer, intermittently operable means for feeding articles thereto in longitudinally spaced groups, and means operable when said feeding means comes to rest to move into the path of travel of the articles at the receiving end of said conveyer and form a positive barrier to the passage of further articles thereto until the feeding means is again operated.

5. In a confectionery machine, a conveyer, intermittently operable means for feeding articles thereto, and a stop member movable into the path of travel of the articles at the receiving end of said conveyer when the feeding means stops and subsequently movable out of said path when the feeding means again starts.

6. In a confectionery machine, an intermittently operable feed belt, a continuously operable conveyer to which articles are fed by the feed belt, the receiving end of said conveyer being separated from the delivery end of the feed belt by a small gap, and means movable in said gap and operable when the feed belt stops on any articles which may lie across the gap to force the same to be carried along by the conveyer or to remain behind with the feed belt.

7. In combination with the conveyer of a confectionery machine, an intermittently operable conveyer for feeding articles in groups thereto, the receiving end of the first conveyer being separated from the delivery end of the second conveyer by a small gap, a plate disposed transversely with respect to the path of travel of said conveyers and having a thin upper edge, said plate mounted to move up and down in said gap, means operable when the feeding conveyer stops to project said plate upwardly sufficiently so that its thin upper edge will engage any articles which may bridge said gap and tilt the same, whereby such articles are either forced to travel with the first conveyer or caused to remain stationary with the second conveyer.

In testimony whereof I have affixed my signature.

ALONZO LINTON BAUSMAN.